United States Patent [19]
Alderman

[11] Patent Number: 4,843,300
[45] Date of Patent: Jun. 27, 1989

[54] IMPROVED POWER SUPPLY FOR INTERMITTENTLY ENERGIZING AN EXTERNAL DEVICE REQUIRING HIGH POWER DURING INTERMITTENT PERIODS OF TIME FROM AN INPUT POWER SOURCE WITH RELATIVELY LOWER INSTANTANEOUS POWER CAPABILITY

[75] Inventor: Arnold N. Alderman, El Segundo, Calif.

[73] Assignee: Dual-Lite Manufacturing, Inc., Naguabo, P.R.

[21] Appl. No.: 145,225

[22] Filed: Jan. 19, 1988

[51] Int. Cl.$^4$ ............................................. G05F 1/618
[52] U.S. Cl. .................................... 323/224; 323/266; 323/285
[58] Field of Search ............... 323/222, 224, 266, 282, 323/284, 285, 286; 363/89, 124

[56] References Cited

U.S. PATENT DOCUMENTS 4,459,537  7/1984  McWhorter ...................... 323/224
4,729,088  3/1988  Wong ................................. 363/124

FOREIGN PATENT DOCUMENTS 0691819  10/1979  U.S.S.R. .............................. 323/266

OTHER PUBLICATIONS

M. Grossoni et al., "Transistorized Low-Power Power Plant for Telecommunication Systems", Intelec. '81, London (May 19–21, 1981), pp. 282–287.

Primary Examiner—Peter S. Wong
Attorney, Agent, or Firm—Mattern, Ware, Stoltz & Fressola

[57] ABSTRACT

An improved power supply capable of driving an external device at relatively high power levels for intermittent periods of time with the power supply driven by relatively low current input power which can vary widely in voltage. The power supply incorporates a step-up switching voltage converter module for increasing the input voltage to a higher value so as to charge an energy storage capacitor to an energy level sufficient to power the external device for said intermittent periods of time at relatively high current. The energy storage device voltage output is regulated by a step-down switching voltage converter module. Control signals sensing the voltage of the energy storage capacitor can be used to control energization and de-energization of the external device.

27 Claims, 4 Drawing Sheets

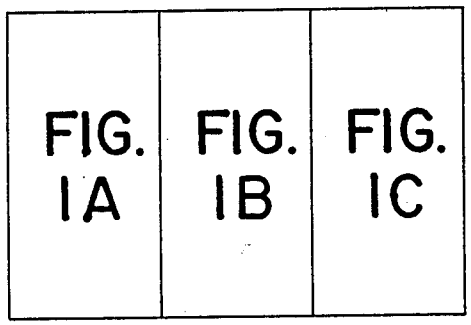
FIG. ID

IMPROVED POWER SUPPLY FOR INTERMITTENTLY ENERGIZING AN EXTERNAL DEVICE REQUIRING HIGH POWER DURING INTERMITTENT PERIODS OF TIME FROM AN INPUT POWER SOURCE WITH RELATIVELY LOWER INSTANTANEOUS POWER CAPABILITY

FIELD OF THE INVENTION

The present invention relates to power supplies and particularly to improvements thereof for driving high power intermittent loads from an unregulated source having low power source capability.

BACKGROUND OF THE INVENTION

Power supplies of various types have been in existence for many years. The present invention addresses a power supply problem for driving a device such as a thermal printer which requires a relatively high current at a low voltage for intermittent periods of time in order to operate properly.

The power supply of the present invention is designed for use where the input voltage can vary widely and where the limited current sourcing capability of this input power source is not necessarily sufficient for driving the desired device (such as a thermal printer). To achieve the required output current and voltage for driving a thermal printer, the present invention incorporates both a step-up switching voltage converter module for charging a high energy storage capacity capacitor to a desired energy level as well as a step-down switching voltage regulator module for using the energy stored in the capacitor for generating the high current required for the thermal printer. Circuitry of this type for use in a power supply is believed to be new and unobvious in view of the prior art.

SUMMARY OF THE INVENTION

A power supply for driving a high current load, such as a thermal printer, on an intermittent basis is disclosed which incorporates both a step-up switching voltage regulator module and a step-down switching voltage converter module in order to store sufficient energy in a high capacity capacitor, and to then use that stored energy for driving the high current load.

The power supply of the present invention is capable of being driven by a direct current voltage source which can vary widely in its operating voltage.

In particular, the present invention is designed for driving a thermal printer and for having its input power obtained from the low voltage power source used in an emergency lighting system having diagnostic and communication capabilities. Such a low voltage source may vary widely in its operating voltage. Indeed, the operating voltage of such low voltage wiring can range from approximately 5 to 20 volts of full wave rectified power. Furthermore, the printer for which the power supply is intended to be used, has a operating requirement of approximately 5.6 volts at up to 4 amperes peak current.

A first stage of the present invention is a step-up switching voltage converter module which receives the input power from the low voltage source and generates an output voltage for charging a high energy capacity capacitor up to approximately 38.2 volts. This capacitor charges to a sufficient energy level ($E = \frac{1}{2}CV^2$; where E is the energy measured in joules, C is the capacitance measured in farads, and V is the voltage measured in volts) to drive a step-down switching voltage converter module that controls the current flow and regulates voltage necessary to drive the thermal printer. During its operation, the voltage is sensed by a monitor circuit. If this voltage falls below a predetermined level, the monitor circuit signals a microprocessor of an associated process or sequence controller, to deactivate the printer. In this manner, improper operation or damage to the printer is avoided should the energy level of the storage capacitor be insufficient for continued proper printer operation.

Furthermore, after each line is printed by the thermal printer, a signal is sent from the power supply to the microprocessor to indicate when the power supply is again able to drive the printer. The process or sequence controller is therefore prevented from activating the printer until the power supply is capable of properly energizing the printer.

OBJECTS OF THE INVENTION

It is therefore the principal object of the present invention to provide an improved regulated power supply for use in driving a relatively high current load for intervals of time at a predetermined voltage from a lower amperage power source that may vary in operating voltage.

Another object of the present invention is to provide an improved power supply of the above description which incorporates a step-up switching voltage converter module for receipt of input power so as to generate a regulated, higher voltage output for energizing a high capacity capacitor, wherein the capacitor is used as an energy storage device whose output power is in turn used and converted by a step-down switching voltage converter module for driving the external load at a relatively fixed predetermined voltage.

A further object of the present invention is to provide an improved power supply of the above description which further incorporates a control signal which informs a process or sequence controller controlling the application or connection of the external load so as to prevent the external load from being energized by the supply until such time that the energy storage device of the power supply has obtained a sufficiently high value so as to be able to properly drive the external load for a period of time sufficient for the external load to complete a desired task.

An additional object of the present invention is to provide an improved power supply of the above description wherein the external load is a thermal printer and wherein the desired task is for the printer to print at least one line of text or data.

A still further object of the present invention is to provide an improved power supply of the above description which further incorporates a second control signal which informs the process or sequence controller to immediately stop the printer whenever the output voltage of the power supply energy storage capacitor falls below a value needed to assure proper regulation of the output voltage to the printer.

Other objects of the present invention will in part be obvious and will in part appear hereinafter.

BRIEF DESCRIPTION OF THE DRAWINGS

For a full understanding of the nature and objects of the present invention, reference should be made to the following detailed description taken in connection with the accompanying drawings, in which:

FIG. 1D is a diagram showing how FIGS. 1A-1C are put together to form FIG. 1.

BEST MODE FOR CARRYING OUT THE INVENTION

Figure 1A:
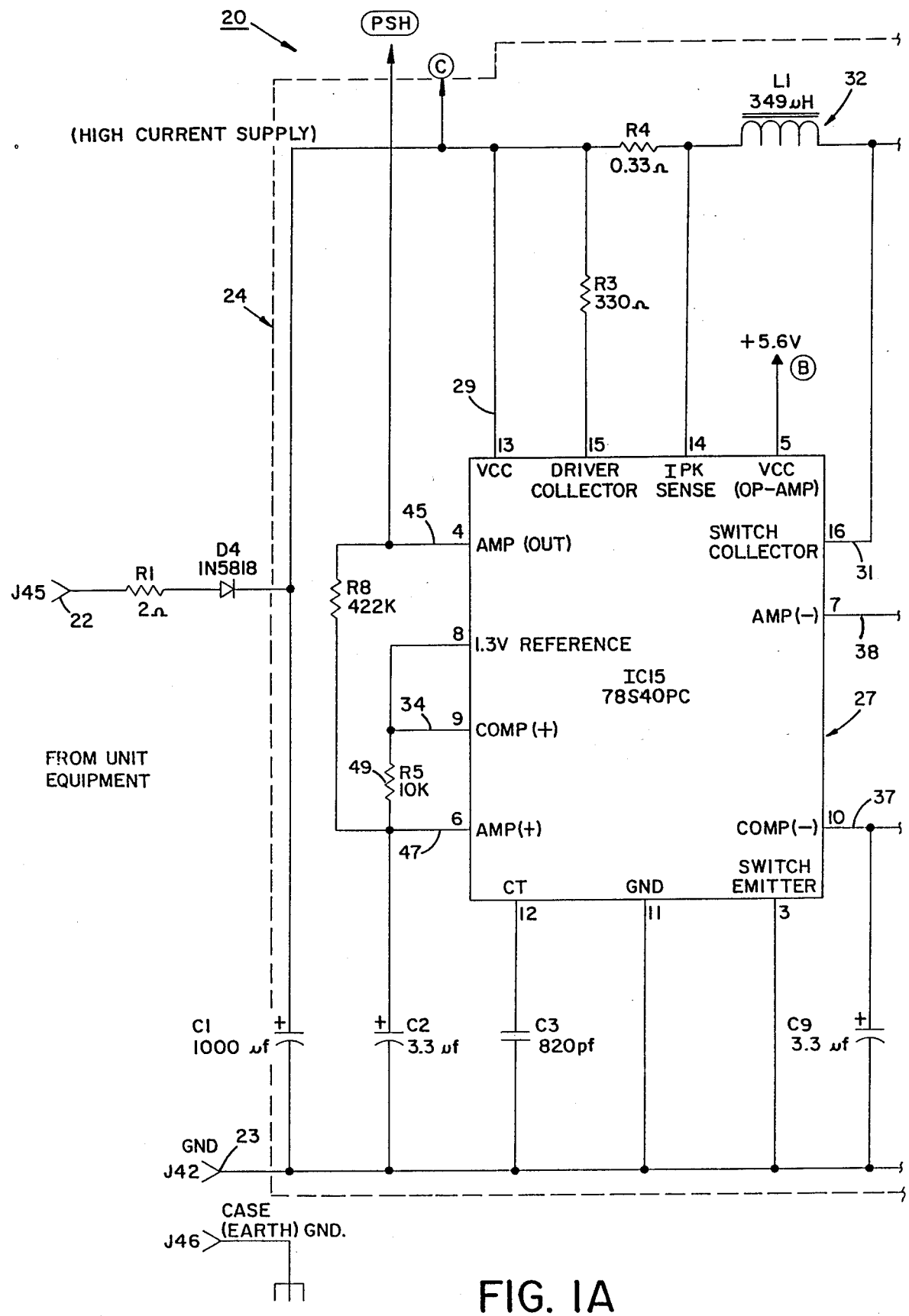
FIGS. 1A-1C form an overall schematic diagram of an improved power supply according to the present invention.
Figure 1B:
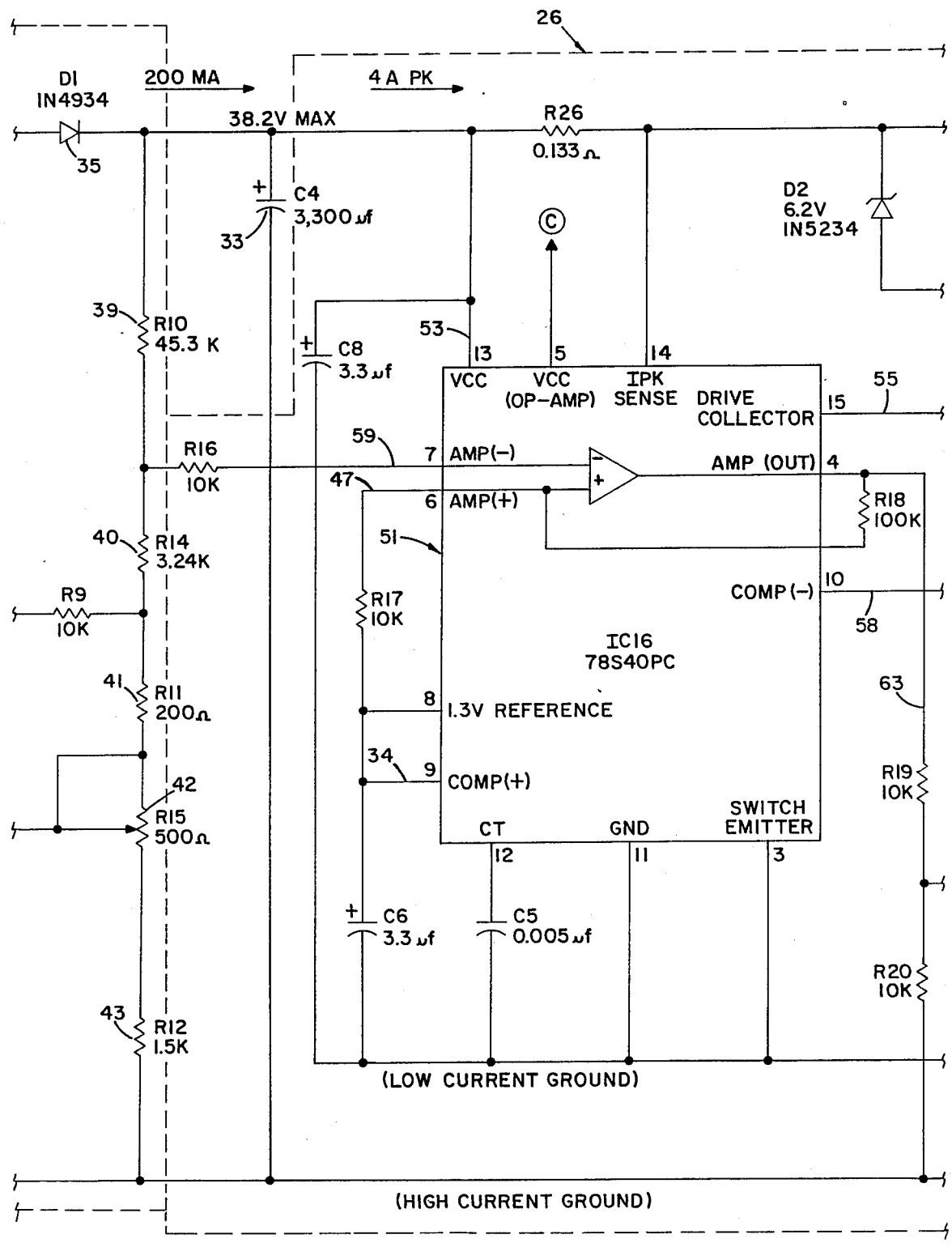
Figure 1C:
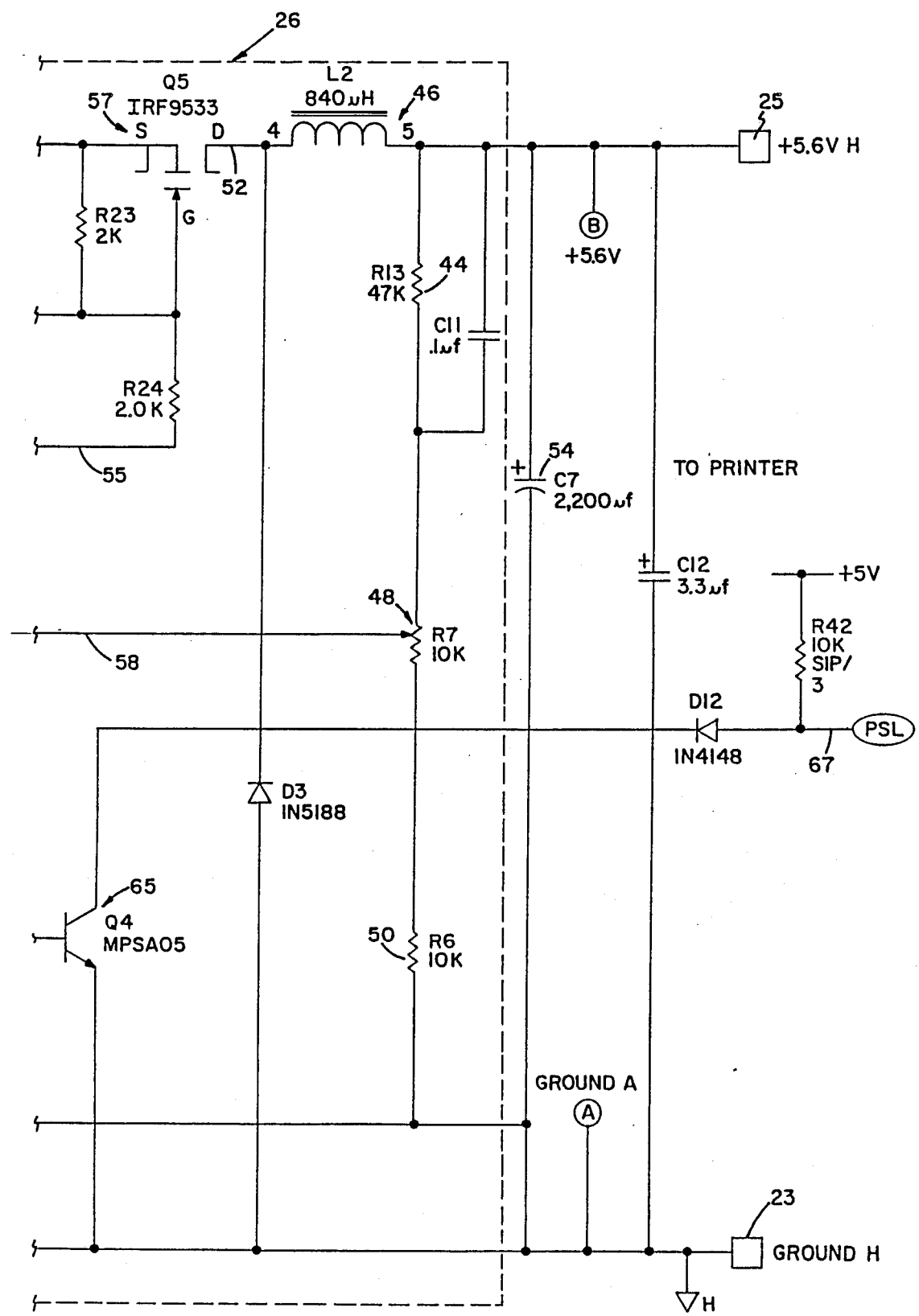

As seen in FIGS. 1A-1C, an improved power supply 20 according to the present invention receives input power across terminals 22 and 23 (23 is the ground terminal). This input power is typically full-wave rectified at an operating voltage of from 5 to 20 volts. The typical input current available is approximately 100 milliamperes. The output power at terminal 25 typically has a value of 5.6 volts direct current (VDC), at a maximum current of 4 amperes. Such an output voltage is designed specifically for use in driving a thermal printer, such as the MTP 102 thermal printer manufactured by Daini Seikosha Co., Ltd. of Tokyo, Japan. Such printers typically require a voltage of approximately 5.6 VDC at a current level of approximately 2 amperes in order to print data properly. Other printers, such as impact printers, could be driven with appropriate changes in output voltage and maximum current capability.

The improved power supply of the present invention is particularly designed for use in a portable communicating device used in conjunction with emergency lighting devices connected together by a communication/power bus. Further information concerning such a communication/power bus can be found in copending U.S. patent application Ser. No. 07/048,530 entitled Emergency Lighting Supervisory Systems, filed May 8, 1987, and U.S. patent application Ser. No. 06/948,313, entitled Improved Line Receiver, filed Dec. 31 1986, both assigned to the present assignee.

Due to the variety of battery voltages used with such interconnected equipment, the wide variation in battery voltage and charge conditions, and the possibly long length of the communication/power bus, the voltage across terminals 22 and 23 can vary from approximately 5 VDC to 20 VDC (full rectified power) at a typical current load of 100 milliamperes (ma). It is therefore necessary that the improved power supply of the present invention be able to convert this widely variable low level input power to a suitably controlled and regulated high level output power for driving a thermal printer associated with the communicating device.

As seen in FIGS. 1A-1C, the improved power supply includes a step-up switching voltage converter module 24, a high capacity energy storage capacitor 33, a step-down switching voltage converter module 26, and a voltage smoothing filter comprising an inductor 46 and a capacitor 54 connected across output terminal 25 and ground terminal 23.

A step-up voltage regulator integrated circuit (IC) 27 (Fairchild Semiconductor Corporation part no. uA78S40) forms part of the step-up ("boost") switching voltage module 24. This voltage regulator receives the input power from terminal 22 on Vcc input 29. The switch collector output 31 of the regulator causes current flow through inductor 32. When this current flow is interrupted by output 31 opening, a voltage pulse is generated across inductor 32 as a result of the rapid current change ($V = L\, di/dt$; where V is the induced voltage measured in volts, L is the inductance measured in henries, and di/dt is the rate of change of current through inductor 32), which adds to the input voltage at Vcc input 29, thereby charging capacitor 33. Diode 35 prevents reverse current flow.

The charge status of capacitor 33 is monitored by the regulator at its COMP(−) input 37, via a voltage divider comprising resistors 39, 40, 41, and 43, and potentiometer 42 (see FIG. 1B). This voltage is compared against a 1.3 volt reference at the COMP (+) input 34 so as charge capacitor 33 to a predetermined voltage, typically 38.2 volts. Potentiometer 42 provides for adjustment of this predetermined fully charged voltage value for capacitor 33.

An operational amplifier (not shown) within step-up regulator 27 has an AMP(+) output 45 which generates an output signal labeled PSH that is used to inform an interconnected process or sequence controller (not shown) controlling the thermal printer or other device that capacitor 33 has obtained a sufficiently high energy level so as to be able to drive the printer for some desired task, such as to print a complete line of characters or data. The internal operational amplifier uses the AMP(−) input 38 and AMP(+) input 47 with feedback resistor 49 to generate the PSH signal only when capacitor 33 has obtained the predetermined voltage level, typically 38.2 volts.

As seen in FIG. 1B, a step-down voltage regulator 51 forming part of step-down ("buck") switching voltage converter module 26 uses the output of capacitor 33 as its Vcc input 53. As shown in FIG. 1C, the step-down switching voltage converter driver/collector output 55 controls the gate 60 of power MOSFET transistor 57 so as to control the average source 61 to drain 52 current flow therethrough. This current flow originates from a high voltage source, capacitor 33, and passes through transistor 57 through inductor 46 to capacitor 54. Inductor 46 limits the rate of current change, thus smoothing the current output to filter capacitor 54, which in turn minimizes the ripple voltage of this capacitor. The output voltage at terminal 25 is established by the duty cycle (ratio of "on time" to "off time") of transistor switch 57.

The driver/collector output 55 duty cycle is regulated by sensing the voltage of a voltage divider comprising resistor 44, potentiometer 48 and resistor 50 at the COMP(−) input 58 of regulator 51. This voltage is compared to a 1.3 volt reference at the COMP(+) input 34. Potentiometer 48 provides for adjustment of the desired output voltage.

While the step-down regulator is operating, the voltage of capacitor 33 is monitored via a voltage divider comprising resistor 39 and resistors 40, 41, 42 and 43 at AMP(−) input 59, as compared to a 1.3 V reference voltage at the AMP(+) input 47 (see FIGS. 1A and 1B). The AMP(OUT) output 63 changes state when the sensed voltage falls below the reference voltage. This output controls transistor 65 so as to generate an output on line 67 (PSL signal, see FIG. 1C) if the capacitor voltage falls below a predetermined level while energizing the thermal printer. This signal ensures that if output 25 cannot be maintained at the desired regulated voltage level, printer is stopped by the interconnected process or sequence controller.

Thus what has been described is an improved power supply for energizing an external load such as a thermal printer requiring relatively high current for short periods of time. The improved power supply can be powered by a source of low current power operating over a wide voltage range and incorporates both a step-up voltage module and a step-down voltage module so as to charge a high capacity capacitor with sufficient energy for energizing an interconnected external device (e.g. a thermal printer) for intermittent periods of time. Control signals are generated by the improved power supply indicative of when sufficient energy has been stored within the capacitor so as to drive the external device as well as any situation which reduces the voltage of the energy storage capacitor below a level necessary to maintain a desired output voltage.

The improved power supply of the present invention is particularly designed for use in conjunction with a portable communicating device for interconnection to a plurality of emergency lighting fixtures having self-diagnostic and communication capability via a communication bus. In one typical application, a thermal printer forms part of this portable communicating device and is used to record the overall test results of the emergency lighting device.

It will thus be seen that the objects set forth above and those made apparent from the preceding description are efficiently attained and, since certain changes may be made in the above construction without departing from the scope of the invention, it is intended that all matter contained in the above description or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. An improved power supply for intermittently energizing an external device that requires, during intermittent periods of time associated with the external device's active operation, relatively high power at a substantially uniform first voltage, wherein the power supply is powered by an input source of power having an instantaneous power capability less than that required by the external device during the external device's active operation, said input source of power operating at a voltage that may vary widely, comprising:

(A) step-up voltage regulating means for increasing and regulating the voltage of the source of power at an output of said means, said means including a first voltage regulator and a first inductor, the first voltage regulator having an output for controlling the voltage induced across the first inductor, said induced voltage driving the output of said means, said step-up voltage regulating means further having means connected to the first voltage regulator for sensing the output voltage of the step-up voltage regulating means for controlling the output of the first voltage regulator;

(B) a capacitor connected to the output of the step-up regulating means for storing sufficient electrical energy to supply the relatively high power required by the external device for each intermittent period of time;

(C) step-down voltage regulator means connected to the output of the energy storage capacitor, said step-down means having an output substantially less than the output voltage of the step-up voltage regulating means, said output of the step-down means for driving the external device, and step-down voltage regulating means including a second inductor, a second voltage regulator and a field effect transistor having its gate controlled by an output of the second voltage regulator with the source and drain of the field effect transistor connected in series between the output of the energy storage capacitor and one end of the second inductor so as to control the current flow through the second inductor, said second inductor connected to the output of the power supply so as to generate the first voltage, said first voltage controlled by the step-down regulator at a current level sufficient to generate the relatively high power required by the external device for each intermittent period of time, said step-down voltage regulating means further having means connected to the second voltage regulator for sensing the output voltage of the power supply for controlling the output of the second voltage regulator; and (D) a second capacitor connected to the other end of the second inductor for smoothing the output voltage to the external device.

2. An improved power supply as defined in claim 1, further comprising means for generating a first control signal for controlling the de-energization of the external device if the voltage of the storage capacitor falls below a first predetermined value.

3. An improved power supply as defined in claim 2, further incorporating means for generating a second control signal so as to enable the energization of the external device when the storage capacitor voltage exceeds a second predetermined value.

4. An improved power supply as defined in claim 3, further comprising means for adjusting the output voltage of the step-down voltage regulating means.

5. An improved power supply as defined in claim 4, wherein the means for sensing the output voltage of the step-up voltage regulating means includes a voltage divider.

6. An improved power supply as defined in claim 5, wherein the means for sensing the output voltage of the step-down voltage regulating means includes a voltage divider.

7. An improved power supply as defined in claim 1, wherein the means for sensing the output voltage of the step-up voltage regulating means includes a voltage divider.

8. An improved power supply as defined in claim 7, wherein the means for sensing the output voltage of the step-down voltage regulating means includes a voltage divider.

9. An improved power supply as defined in claim 1, further incorporating means for generating a control signal so as to enable the energization of the external device when the storage capacitor voltage exceeds a predetermined value.

10. An improved power supply as defined in claim 9, further comprising means for adjusting the output voltage of the step-down voltage regulating means.

11. An improved power supply as defined in claim 10, wherein the means for sensing the output voltage of the step-down voltage regulating means includes a voltage divider.

12. An improved power supply as defined in claim 11, wherein the means for sensing the output voltage of the step-up voltage regulating means includes a voltage divider.

13. An improved power supply for intermittently energizing an external device that requires, during intermittent periods of time associated with the external device's active operation, relatively high power at a substantially uniform first voltage, wherein the power supply is powered by an input source of power having an instantaneous power capability less than that required by the external device during the external device's active operation, said input source of power operating at a voltage that may vary widely, comprising:

(A) step-up voltage means for increasing and regulating the voltage of the input source of power at an output of said means, said means including a first voltage regulator and a first inductor, the first voltage regulator having an output for controlling the voltage induced across the first inductor, said induced voltage driving the output of said means, said step-up voltage means further having means connected to the first voltage regulator for sensing the output voltage of the step-up voltage regulating means for controlling the output of the first voltage regulator;

(B) a capacitor connected to the output of the step-up regulating means for storing sufficient electrical energy to supply the relatively high power required by the external device for each intermittent period of time; and (C) step-down voltage means connected to the output of the energy storage capacitor, said step-down means having an output substantially less than the output voltage of the step-up voltage regulating means, said output of the step-down means for driving the external device, said step-down voltage means including a second inductor, a second voltage regulator and a field effect transistor having its gate controlled by an output of the second voltage regulator with the source and drain of the field effect transistor connected in series between the output of the energy storage capacitor and one end of the second inductor so as to control the current flow through the second inductor, said second inductor connected to the output of the power supply so as to generate the first voltage, said first voltage controlled by the step-down regulator at a current level sufficient to generate the relatively high power required by the external device for each intermittent period of time, said step-down voltage means further having means connected to the second voltage regulator for sensing the output voltage of the power supply for controlling the output of the second voltage regulator.

14. An improved power supply as defined in claim 13, further comprising means for generating a first control signal for controlling the de-energization of the external device if the voltage of the storage capacitor falls below a first predetermined value.

15. An improved power supply as defined in claim 14, further incorporating means for generating a second control signal so as to enable the energization of the external device when the storage capacitor voltage exceeds a second predetermined value.

16. An improved power supply as defined in claim 15, further comprising means for adjusting the output voltage of the step-down voltage regulating means.

17. An improved power supply as defined in claim 16, wherein the means for sensing the output voltage of the step-up voltage regulating means includes a voltage divider.

18. An improved power supply as defined in claim 17, wherein the means for sensing the output voltage of the step-down voltage regulating means includes a voltage divider.

19. An improved power supply as defined in claim 14, wherein the means for sensing the output voltage of step-up voltage regulating means includes a voltage divider.

20. An improved power supply as defined in claim 14, wherein the means for sensing the output voltage of the step-down voltage regulating means includes a voltage divider.

21. An improved power supply for intermittently energizing an external device that requires, during intermittent periods of time associated with the external device's active operation, relatively high power at a substantially uniform first voltage, wherein the power supply is powered by an input source of power having an instantaneous power capability less than that required by the external device during the external device's active operation, said input source of power operating at a voltage that may vary widely, comprising:

(A) step-up voltage means for increasing the voltage of the input source of power at an output of said means;

(B) a capacitor connected to the output of the step-up voltage means for storing sufficient electrical energy to supply the relative high power required by the external device for each intermittent period of time;

(C) step-down voltage means connected to the output of the energy storage capacitor, said step-down means having an output substantially less than the output voltage of the step-up voltage regulating means, said output of the step-down means for driving the external device; and (D) means for generating a first control signal for controlling the de-energization of the external device if the voltage of the capacitor connected to the output of the step-up voltage means falls below a first predetermined value.

22. An improved power supply as defined in claim 21, wherein the step-up voltage means includes a first voltage regulator and first means for generating output pulses having a peak voltage greater than that of the input source of power, said first pulse generating means controlled by the first voltage regulator, wherein the first voltage regulator has an output for controlling said first means and wherein said first means drives the output of the step-up voltage means, said step-up voltage means further having means connected to the first voltage regulator for sensing the output voltage of the first means so as to control the output of the first voltage regulator; and wherein the step-down voltage means comprises a second voltage regulator, a second pulse generating means, and a current amplifying means controlled by the output of the second voltage regulator, the output of the current amplifying means controlling the current flow to the second pulse generating means so that the output of the second pulse generating means is at the desired output voltage; further wherein the step-down voltage means comprises means connected to the second voltage regulator for sensing the output voltage of the power supply so as to control the output of the second voltage regulator.

23. An improved power supply as defined in claim 22, further comprising;

(D) a second capacitor connected to the output of the second pulse generator means for smoothing the output voltage of the second pulse generator means to the external device.

24. An improved power supply as defined in claim 23, further incorporating means for generating a second control signal so as to enable the energization of the external device when the voltage of the capacitor connected to the output of the step-up voltage means exceeds a second predetermined value.

25. An improved power supply as defined in claim 24, further comprising means for adjusting the output voltage of the step-down voltage means.

26. An improved power supply as defined in claim 22, further comprising means for generating a second control signal for controlling the de-energization of the external device if the voltage of the capacitor connected to the output of the step-up voltage means falls below a second predetermined value.

27. An improved power supply as defined in claim 21, further incorporating means for generating a second control signal so as to enable the energization of the external device when the voltage of the capacitor connected to the output of the step-up voltage means exceeds a second predetermined value.

* * * * *